March 9, 1965 D. F. SMITH 3,172,644
ROTARY TUMBLER AND METHOD FOR MAKING SAME
Filed March 12, 1963 2 Sheets-Sheet 1
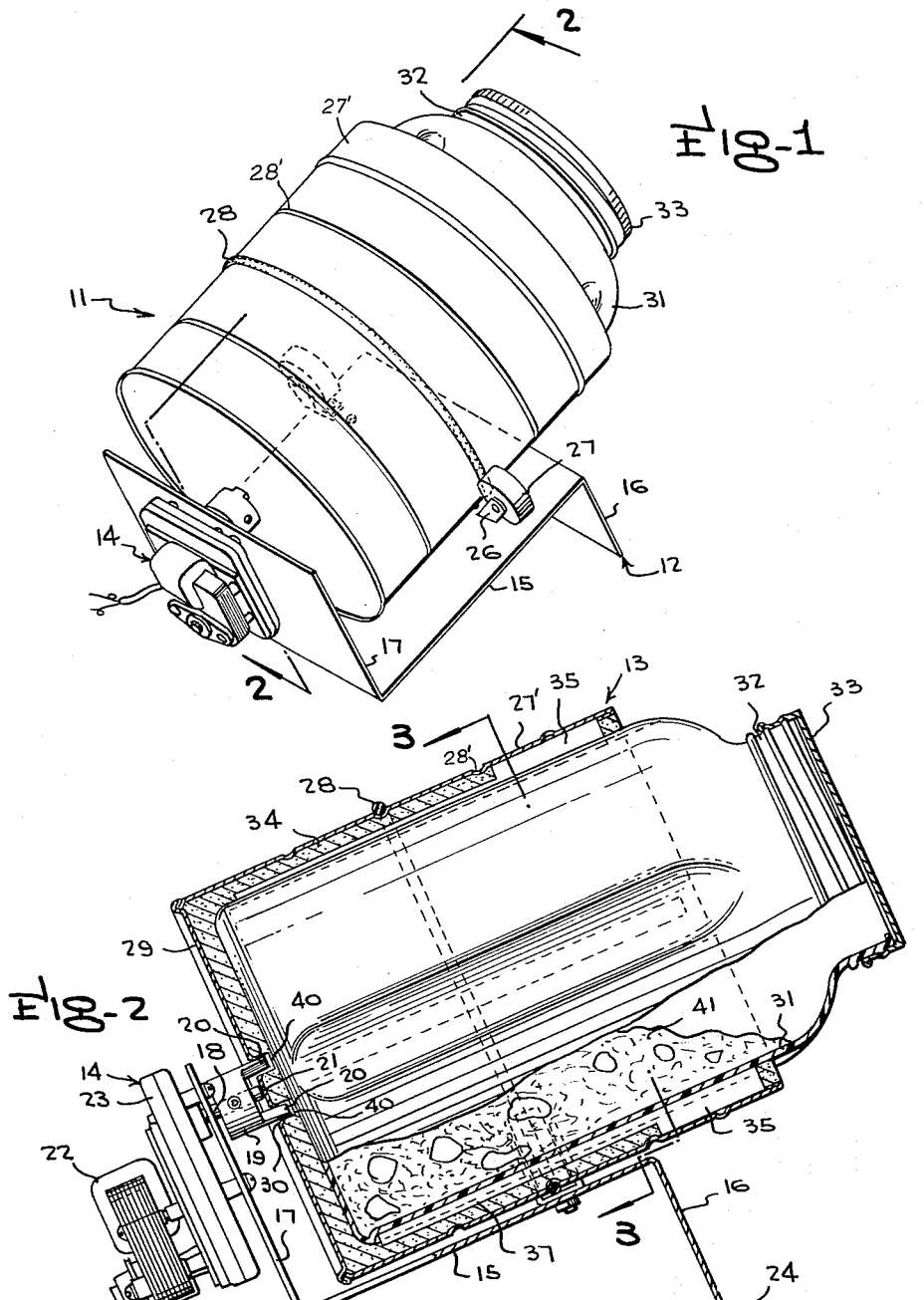
INVENTOR.
DEAN F. SMITH
BY
McMorrow, Berman & Davidson
ATTORNEYS March 9, 1965  D. F. SMITH  3,172,644
ROTARY TUMBLER AND METHOD FOR MAKING SAME
Filed March 12, 1963  2 Sheets-Sheet 2
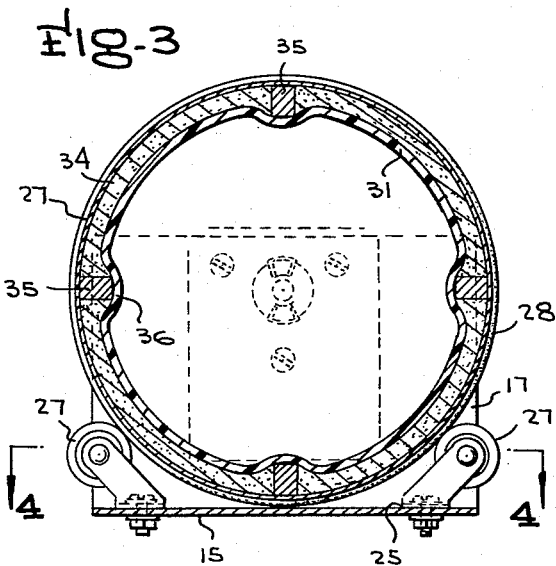
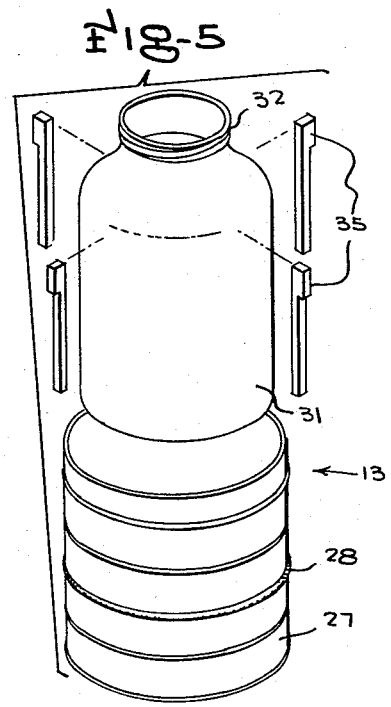
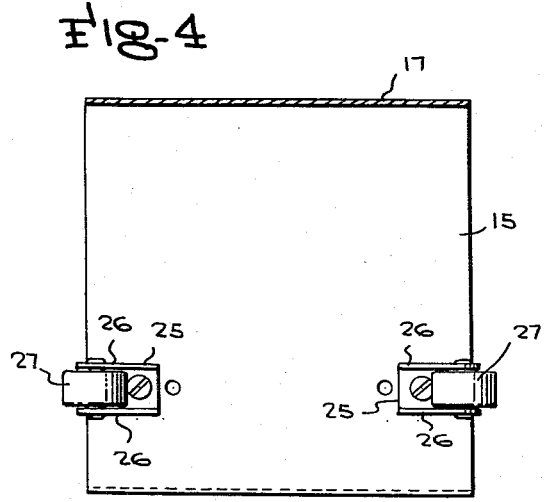
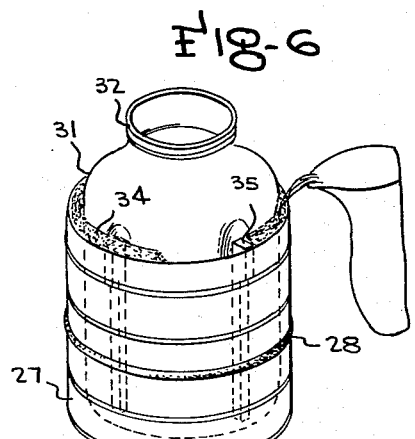
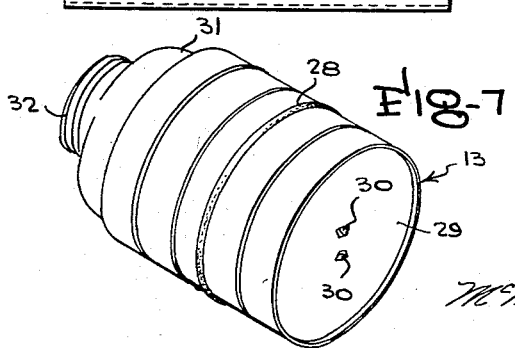
INVENTOR.
DEAN F. SMITH

United States Patent Office 3,172,644
Patented Mar. 9, 1965

3,172,644
ROTARY TUMBLER AND METHOD FOR MAKING SAME
Dean F. Smith, P.O. Box 203, Bismarck, N. Dak.
Filed Mar. 12, 1963, Ser. No. 264,496
8 Claims. (Cl. 259—81)

This invention relates to mixing devices, and more particularly to a portable mixing device of the type employing a rotary tumbler, which may be employed for mixing powder, or the like, for abrading, or for similar purposes.

A main object of the invention is to provide a novel and improved portable tumbling apparatus which is simple in construction, which is easy to fabricate, and which provides efficient, thorough and relatively quiet mixing and abrading action.

A further object of the invention is to provide an improved portable mixing device of the type employing an inclined rotating container, the device being inexpensive to manufacture, being durable in construction, and being very compact in size.

A still further object of the invention is to provide an improved method for forming a tumbling container for use in a portable mixing or tumbling apparatus, the method involving simple steps, utilizing relatively inexpensive components, and requiring only relatively simple facilities for carrying out same.

Further objects and advantages of the invention will become apparent from the following description and claims, and from the accompanying drawings, wherein:

FIGURE 1 is a perspective view of an improved portable mixing and tumbling device constructed in accordance with the present invention.

FIGURE 2 is an enlarged vertical cross sectional view taken substantially on the line 2—2 of FIGURE 1.

FIGURE 3 is a transverse cross sectional view taken substantially on the line 3—3 of FIGURE 2.

FIGURE 4 is a cross sectional view taken substantially on the line 4—4 of FIGURE 3.

FIGURE 5 is a perspective view, to a reduced scale, showing the various elements of the mixing and tumbling container, employed in the assembly of FIGURES 1 to 4, but showing the parts prior to the fabrication of the container with said parts in separated positions.

FIGURE 6 is a perspective view showing a tumbling and mixing container, as employed in FIGURES 1 to 4, formed from the components of FIGURE 5 and in the final stage of fabrication.

FIGURE 7 is a perspective view showing a completed mixing and tumbling container adapted to be used in the assembly of FIGURES 1 to 4.

Referring to the drawings, and more particularly to FIGURES 1 to 4, 11 generally designates a portable rotary mixing and tumbling device according to the present invention, said device comprising a generally V-shaped supporting stand 12 and a rotary mixing and tumbling container 13 rotatably supported on the stand and being rotated by a drive unit 14.

The stand 12 comprises a plate-like main body portion 15 formed at its forward end with a depending flange 16 extending downwardly from and at right angles to the forward marginal portion of the main body member 15. At its rear marginal portion said main body 15 is formed with the upstanding flange 17, projecting upwardly and at right angles to the main body portion 15. The drive unit 14 is secured to the upstanding flange 17 and is provided with the output shaft 18 which extends through an aperture in the flange 17 and has secured thereon a coupling head 19 formed with a pair of diametrically opposed drive lugs 20, 20. The head 19 is further formed with a bearing lug 21 located intermediate the drive lugs 20, 20 and of relatively short length as compared with the lengths of said drive lugs.

As is clearly shown in FIGURES 1 and 2, the drive unit 14 comprises an electric motor 22 which is provided with a gear reduction unit 23, the motor being fastened to said gear reduction unit, and the gear reduction unit being in turn fastened to the flange 17.

As shown in FIGURE 2, the stand 12 is adapted to be supported on a horizontal surface 24 with the bottom edge of the flange 16 engaging said horizontal surface and the corner between flange 17 and the plate-like main body portion 15 also engaging the horizontal surface 24, whereby the member 15 is supported in an inclined position.

Designated at 25, 25 are respective roller brackets which are secured on the member 15 at opposite side margins thereof and in positions transversely aligned with each other. The brackets 25 are provided with the parallel arms 26, 26 and journaled between each pair of arms 26, 26 is a roller 27, the rollers 27, 27 being symmetrically located relative to the axis of the driving shaft 18.

The container 13 has an outer shell portion 27' formed with a plurality of peripheral grooves 28', one of said grooves being so located that when the container is operatively supported on the stand 12 the groove will be coplanar with the rollers 27, 27. Positioned in this groove is a resilient deformable O-ring 28 which is retained in position by the groove and which engages the rollers 27, 27, serving as a cushioning means to resiliently support a container for rotation on the stand 12.

The outer container or shell 27' comprises relatively rigid material, such as thin sheet metal, or the like, and may be a conventional cylindrical metal can. The container 27' is provided with the end wall 29 which is formed at its central portion with a pair of apertures 30, 30 spaced to receive the drive lugs 20, 20.

The container 13 further comprises an inner vessel 31 of relatively flexible material, such as flexible plastic material, having the externally threaded neck portion 32 on which may be engaged the conventional jar cover 33. The space between the inner container 31 and the outer container 27' is filled with relatively rigid sound-absorbing material 34, such as plaster of Paris, cement, or the like. At evenly spaced locations around the container longitudinally extending bar members 35 are interposed between the inner container 31 and the outer container 27', the bar members 35 being of greater transverse thickness than the normal spacing between the inner container 31 and the outer container 27', whereby to deform said inner container inwardly and to define longitudinally extending internal agitating ribs 36, as shown in FIGURE 3. The bar members 35 are embedded in the filler material 34 so that they are rigidly locked in the positions thereof illustrated in FIGURE 3.

As shown in FIGURE 2, the bar members 35 are of reduced thickness at their inner portions, as shown at 37, to provide clearance for the filler material 34. As is further shown in FIGURE 2, the unreduced upper portions of the bar members 35 are of substantial length so that said bar members will be gripped between the inner container 31 and the rigid outer container 27' in a manner to hold the bar members 35 in longitudinally extending positions with the inner container 31 deformed inwardly along the entire length of the bar members 35 prior to the insertion of the filler material 34, as will be readily described.

In forming the container 13, the flexible plastic inner vessel 31 is inserted into the rigid outer container 27', and the clamping keys or bars 35 are then engaged between the inner container 31 and the outer container 27' to deform the inner container inwardly, as well as to support the inner container in a position such that its bottom wall is spaced slightly above the bottom wall 29 of the outer container. The bar members 35 are inserted at equal spacings circumferentially around the inner container 31, and the unreduced top portions of the bar members serve as alignment means to hold the bar members in positions extending longitudinally, namely, parallel to the axis of the container, with the reduced lower portions 37 of the bar members engaged against the inner container 31 and held clear of the wall of the rigid outer container 27', namely, in the positions illustrated in FIGURE 2.

As will be apparent from FIGURES 5, 6 and 7, the inner container 31 is substantially greater in height than the outer container 27', so that the top of the inner container, including the neck portion 32, projects from the outer container 27'. However, the inwardly deformed portions 36 of the inner container extend substantially for the major portion of the length of the inner container.

After the bar members 35 have been inserted in the manner above described, the space between the vessels 27' and 31 is filled with suitable material capable of forming a relatively rigid sound-absorbent filling, such as plaster of Paris, or the like. The material 34 is poured into the space between the containers in the manner illustrated in FIGURE 6, sufficient filler material being inserted to completely fill this space, after which the material 34 is allowed to harden. While the material is still relatively soft, a suitable forming die member shaped similarly to the head 19 may be engaged in the apertures 30, 30 to form recesses 40, 40 in the filler material adjacent said apertures, or an actual driving head 19 may be employed as such a forming die.

After the material 34 has hardened, the bars 35, 35 will be firmly locked in their positions illustrated in FIGURES 2 and 3, thus permanently supporting the inwardly deformed rib portions 36 of the inner container 31.

The cushioning ring 28 may be engaged in its supporting groove either before the container 13 is assembled, or at any time subsequent to the hardening of the filler material 34.

In operation, the container 13 is supported in an inclined position with the drive lugs 20, 20 engaged through the apertures 30, 30 and received in their recesses 40, 40. The cushioning ring 28 engages on the rollers 27, 27, thus resiliently supporting the container in the inclined position thereof shown in FIGURE 2. When the driving unit 14 is energized the container is thus rotated around its axis, and the material 41 contained therein is thus tumbled and shifted continuously as the container rotates, being agitated by periodic engagement with the internally projecting rib members 36.

While a specific embodiment of an improved portable tumbling and mixing apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A method of forming a tumbling container comprising inserting a flexible inner vessel into a rigid outer vessel, inserting a plurality of elongated spacer members between the inner vessel and the outer vessel to deform the inner vessel inwardly and to form internal ribs therein, and thereafter at least partially filling the space between the vessels with plastic cement material able to harden and to become substantially rigid, whereby to permanently lock the spacer members between the inner vessel and the outer vessel.

2. A method of forming a tumbling container comprising inserting a flexible inner vessel into a rigid outer vessel, inserting a plurality of elongated spacer members between the inner vessel and the outer vessel, said spacer members being arranged longitudinally and being of greater cross sectional thickness than the distance between the vessels, whereby to deform the inner vessel inwardly and to form internal longitudinal agitating ribs therein, and thereafter at least partially filling the space between the vessels with plastic cement material able to harden and to become substantially rigid, whereby to permanently lock the spacer members between the inner vessel and the outer vessel.

3. A method of forming a tumbling container comprising inserting a flexible inner vessel into a rigid outer vessel, inserting a plurality of elongated spacer members between the inner vessel and the outer vessel, said spacer members being arranged longitudinally and being of greater cross sectional thickness than the distance between the vessels, whereby to deform the inner vessel inwardly and to form internal longitudinally extending agitating ribs therein, and thereafter completely filling the space between the vessels with plastic cement material able to harden and to become substantially rigid, whereby to permanently lock the spacer members between the inner vessel and the outer vessel.

4. A tumbling container comprising a rigid outer vessel, a flexible inner vessel, a plurality of longitudinally extending circumferentially spaced bar members disposed between the vessels and being of sufficient cross sectional thickness to deform the inner vessel inwardly, whereby to define longitudinal internal agitating ribs, and a mass of hardened cement material disposed between the vessels and embedding and rigidly holding said bar members.

5. A tumbling container comprising a rigid outer vessel, a flexible inner vessel, a plurality of longitudinally extending circumferentially spaced rigid spacing bars disposed between the vessels and being of sufficient cross sectional thickness to deform the inner vessel inwardly, whereby to define longitudinal internal agitating ribs, and a mass of hardened cement material disposed between the vessels and embedding and rigidly holding said rigid spacing bars, said outer vessel having an end wall provided with driving means.

6. A tumbling container comprising a rigid outer vessel, a flexible inner vessel, a plurality of longitudinally extending circumferentially spaced bar members disposed between the vessels and being of sufficient cross sectional thickness to deform the inner vessel inwardly, whereby to define longitudinal internal agitating ribs, a mass of hardened cement material disposed between the vessels and embedding and rigidly holding said bar members, said outer vessel being formed with an outwardly facing peripheral groove, and a resilient deformable ring member externally mounted in said groove and surrounding said outer vessel.

7. A tumbling container comprising a rigid outer vesset, a flexible inner vessel, a plurality of longitudinally extending circumferentially spaced rigid spacer bars disposed between the vessels and being of sufficient cross sectional thickness to deform the inner vessel inwardly, whereby to define longitudinal internal agitating ribs, a mass of hardened cement material disposed between the vessels and embedding and rigidly holding said rigid spacer bars, said outer vessel having an end wall formed at its center portion with a pair of spaced guiding apertures, said outer vessel being formed with an outwardly facing peripheral groove, and a resilient deformable ring member externally mounted in said groove and surrounding said outer vessel.

8. A tumbling container comprising an outer vessel of rigid sheet material provided with an end wall formed at its central portion with a pair of apertures spaced to receive drive lugs, a flexible inner vessel disposed in said first-named vessel, a plurality of longitudinally extending circumferentially spaced rigid spacer bars disposed between said vessels and being of sufficient thickness to deform the inner vessel inwardly at the edges of contact of the spacer bars therewith, whereby to define longitudinal internal agitating ribs, a layer of cement material disposed between the vessels and being of substantially lesser thickness than the spacer bars, said layer rigidly securing said spacer bars between the vessels, and a resilient deformable ring member externally mounted on and surrounding the intermediate portion of said outer vessel.

References Cited by the Examiner
UNITED STATES PATENTS

| | | | |
|---|---|---|---|
| 1,121,349 | 12/14 | Goss | 215—12 |
| 2,103,679 | 12/37 | Kline et al. | |
| 2,203,430 | 6/40 | Goldberg et al. | 259—81 |
| 2,352,205 | 6/44 | Karlson | 259—107 |
| 2,451,486 | 10/48 | Horton | 220—15 |
| 2,510,858 | 6/50 | Black | 259—81 |
| 2,597,291 | 5/52 | Clegg | 259—81 |
| 2,757,911 | 8/56 | Verady | 259—177 |
| 2,805,787 | 9/57 | Sherman. | |
| 2,812,874 | 11/57 | Casalino | 215—13 |
| 2,993,350 | 7/61 | Smith | 259—81 |
| 3,037,652 | 6/62 | Wallace | 215—13 |

CHARLES A. WILLMUTH, *Primary Examiner.*